(No Model.)

W. BROWN.
COMBINED HARROW AND CLOD CRUSHER.

No. 369,686. Patented Sept. 13, 1887.

Witnesses:
Antoine Dorticos
John Calvin Stevens

Inventor
William Brown
by S. W. Bates
his atty.

UNITED STATES PATENT OFFICE.

WILLIAM BROWN, OF WATERVILLE, MAINE.

COMBINED HARROW AND CLOD-CRUSHER.

SPECIFICATION forming part of Letters Patent No. 369,686, dated September 13, 1887.

Application filed November 3, 1886. Serial No. 217,878. (No model.)

*To all whom it may concern:*

Be it known that I, WILLIAM BROWN, a citizen of the United States, residing at Waterville, in the county of Kennebec and State of Maine, have invented certain new and useful Improvements in Combined Harrow and Clod-Crusher; and I do hereby declare the following to be a full, clear, and exact description of the invention, such as will enable others skilled in the art to which it appertains to make and use the same.

My invention relates to a combined harrow and clod-crusher; and it consists, essentially, of a drag having affixed to its under side, near the forward end, a row of teeth or blades placed closely side by side, said teeth being composed of flat pieces of metal having a half-twist and having their forward or cutting edges sharpened. The said teeth have an inclination downward and backward, and there is also affixed to the bottom surface of the drag a smoothing-rib located in the rear of said row of teeth.

My invention is fully illustrated in the accompanying drawings, in which—

Figure 1:
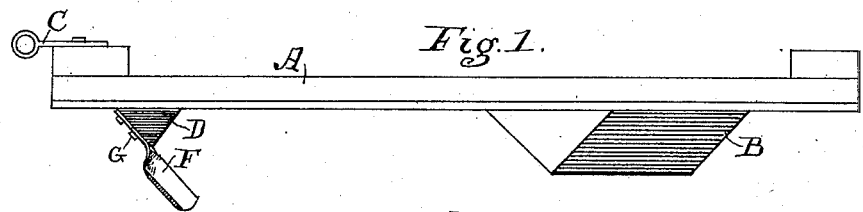
Figure 2:
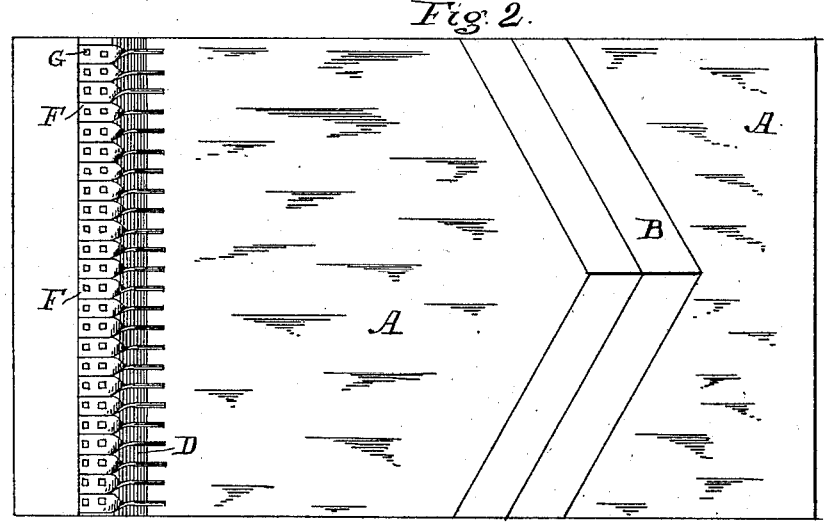
Figure 3:
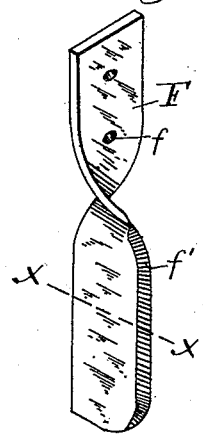
Figure 4:

Figure 1 is a side elevation. Fig. 2 is a plan of the bottom. Fig. 3 is a detail of the tooth. Fig. 4 is a section through tooth on lines *x x*.

A is a drag, of any ordinary construction. It may be made of light weight by having a frame with a light planking on the bottom.

D is a triangular cross-bar rigidly secured to the bottom of the drag A and having bolted to its forward face the row of teeth F, side by side. These teeth F are composed of a single flat bar of iron or steel having a half-twist, so that the lower portion has its edge lengthwise of the drag. The lower portion of each tooth F is sharpened into a cutting-edge, *f'*, and the teeth are bolted on by means of bolts G, passing through the holes *f* in the upper portion or shank. The teeth are placed in position inclined backward and downward and side by side, as before stated. The forward face of the cross-bar D is thus faced with metal and thoroughly iron-clad, and is thus very durable, even under the exceedingly hard usage it is subjected to. One or more smoothing-ribs, B, are secured to the under surface of the drag in rear of the teeth F.

As the drag is drawn along by the fastening C that portion of the teeth containing the twist comes in contact with the larger lumps of soil and tends to break and crush them, while the sharpened portion of the tooth cuts the lumps and clods, reducing all to a state of comparative fineness. The teeth being near together, they cut the clods into fine pieces, their inclined position preventing them from clogging up. The angular smoothing-rib B smooths and levels off the surface. I prefer to make the teeth out of steel plate, which may be heated and twisted and then ground off to form an edge.

I am aware that heretofore twisted teeth having sharpened front edges have been used in harrows and in similar devices, and also that similar teeth have been set at an incline to the body of the harrow; also, that in harrows a rear smoothing device is a very common feature.

I claim—

A harrow or clod-crusher having on its under side and forwardly the rigidly-attached transverse bar D, triangular in cross-section, and the twisted metal teeth F, having cutting-edges I, and secured to said bar at an incline and side by side, and thus forming a complete metal facing for said bar, and the angular smoothing-rib B in the rear, the several parts made and all combined substantially as set forth.

In testimony whereof I affix my signature in presence of two witnesses.

WM. BROWN.

Witnesses:
H. D. BATES,
L. B. SPENCER.